United States Patent [19]
Helmig

[11] Patent Number: 5,437,797
[45] Date of Patent: Aug. 1, 1995

[54] MERCURY REMOVAL FROM WASTE WATER

[75] Inventor: Edward G. Helmig, Harleysville, Pa.

[73] Assignee: American Home Products Corporation, Madison, N.J.

[21] Appl. No.: 259,764

[22] Filed: Jun. 14, 1994

[51] Int. Cl.[6] .............................................. C02F 9/00
[52] U.S. Cl. .................................... 210/669; 210/679; 210/688; 210/694; 210/914; 210/917
[58] Field of Search ............... 210/669, 676, 679, 688, 210/694, 914, 917

[56] References Cited
U.S. PATENT DOCUMENTS

| | | | |
|---|---|---|---|
| 3,736,253 | 5/1973 | De Angelis et al. | 210/669 |
| 4,305,827 | 12/1981 | Sasaki | 210/688 |
| 4,500,494 | 2/1985 | Scher | 210/688 |
| 5,154,833 | 10/1992 | Robinson | 210/688 |

*Primary Examiner*—Ivars Cintins
*Attorney, Agent, or Firm*—Richard K. Jackson

[57] ABSTRACT

Method for removal of organic and inorganic mercury contaminants from a biological vaccine production facility.

7 Claims, 1 Drawing Sheet

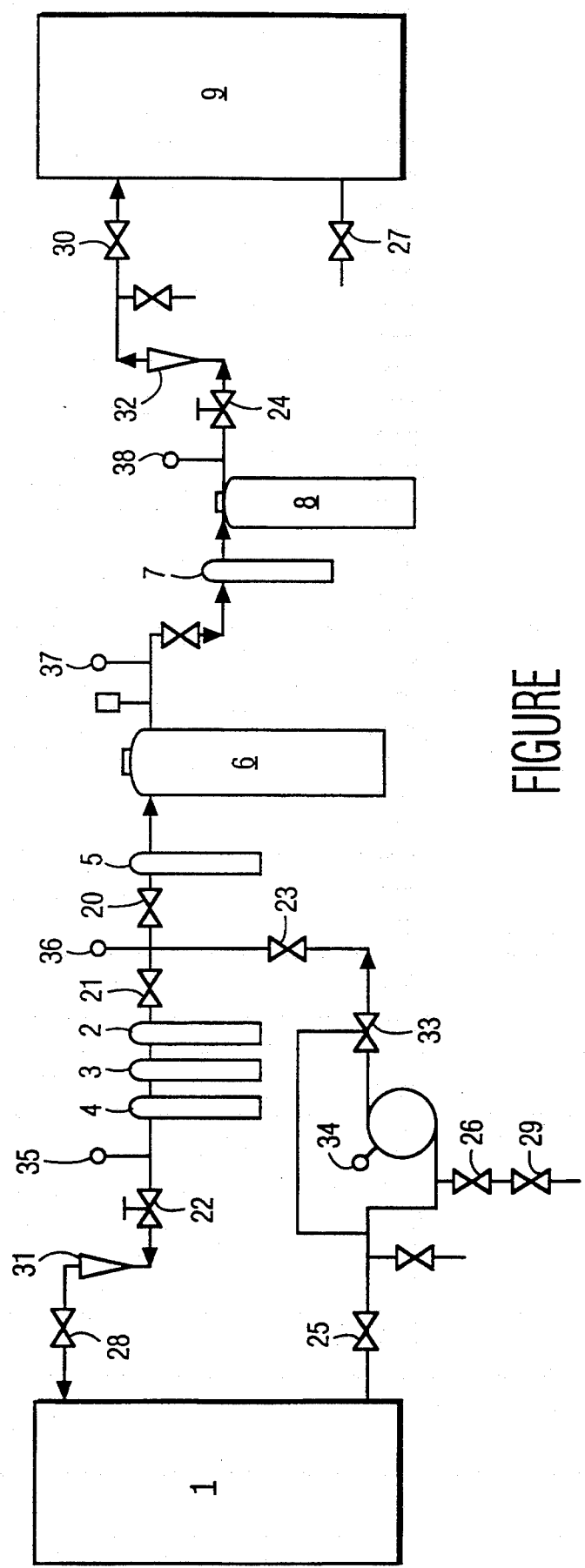

5,437,797

MERCURY REMOVAL FROM WASTE WATER

BACKGROUND OF THE INVENTION

The disposal of mercury contaminated waste water, generated during the cleansing of contaminated glassware and as a result of analytical mercury testing procedures in conjunction with the use of organic mercurial agents to produce bacteriostatic water (phenyl mercuric nitrate) or preserve certain biological vaccines (thimerosal), poses a major problem in the pharmaceutical industry where relatively large volumes of water containing small amounts of both organic and inorganic mercury compounds are produced. Discharge waters to natural water bodies or directly to water treatment facilities may be required to contain undetectable mercury concentration to meet current environmental regulations. Present analytical methods are capable of detecting mercury in waste water in amounts as low as 0.2 parts per billion. Hence, very efficient water treatment processes are needed to obtain waste water purity levels meeting that restriction, without markedly increasing the cost of the vaccine which would require price increases in excess of consumer's price index guidelines.

U.S. Pat. No. 5,154,833 discloses a process for removing thimerosal from the effluent of a vaccine manufacture operation, to achieve what was then an environmentally acceptable level at less than 3 parts per billion mercury. The process involved (1) chlorinating the organic mercury compound (preferably with sodium hypochlorite) at a pH less than 3, to obtain a mercurous ($H^+$) salt ion. (2) The aqueous solution was then dechlorinated in a three step operation involving (a) aeration for from 8 to 20 hours, preferably 12 to 20 hours to strip all gaseous chlorine from the solution, (b) addition of a stoichometric amount of sodium metabisulfite to tie up the rest of the hypochlorite (this requires analysis of the solution to determine how much hypochlorite is left after air stripping), and (c) treatment of the bisulfite containing solution with activated carbon to remove the sodium bisulfite bound hypochlorite, and (3) as the final step, passing the chlorine free solution over an ion exchange resin having thiol functional groups to covalently bond the mercury to sulfur.

BRIEF DESCRIPTION OF THE INVENTION

In accordance with this invention there is provided a process for removal of organic and inorganic mercury, including methylmercury, mercuric chloride, mercurochrome, thimerosal and surface washings with detergents, from waste water effluent from vaccine production facilities to afford environmentally acceptable water for disposal in surface water bodies or through municipal water sewer systems, which comprises (1) passing water containing mercury from all contamination sources within a vaccine production facility, through one or more molecular sieve filters providing pore sizes from about 100 millimicrons to about 1 millimicrons to reduce the amount of suspended solids to less than 30 milligrams per liter and ideally less than 10 milligrams per liter, (2) adjusting the pH of the solution to about 6 with HCl if it is above pH 6 (3) contacting the mercury containing effluent from the molecular sieve filters with granular activated carbon to remove additional colored organic material, and (4) passing the decolorized aqueous solution through a macroporous, cross linked polystyrene resin having polyisothiouronium functional groups. The effluent from these operations is continuously or intermittently monitored for mercury to assure the desired acceptable concentration is achieved. As the chelating resin becomes exhausted, it may either be replaced or destroyed by incineration to recover the mercury in the stack gas and/or ash for disposal.

The method of this invention is more economical than the prior art method for removal of thimerosal in that it is effective with both inorganic and organic contaminants, omits the preliminary chlorination step and the following three stage dechlorination procedures of the prior art, substituting for those chemical treatments, a simple filtration stage for removal of suspended solid contaminants. In addition, the final stage of this invention for mercury removal involves chelation of mercury rather than the ion exchange technology of the prior art.

The process of this invention can be run as a batch process or as a continuous process, in the latter case with intermediate automatic controls after each stage to monitor filtration, activated carbon treatment and resin chelating efficiencies and adjust the pH as necessary. To aid in mercury removal, the activated carbon may be impregnated with dithiocarbamic acid. The molecular sieves employed to remove gross suspended solids are commercially available spun fiber cartridges with pores ranging from about 100 millimicrons down to about 1 millimicron. Preferably several grades of sieve are employed in separated filtration series so that the flow of material is not markedly reduced by clogging and individual filter cartridges may be replaced or regenerated as needed. Although a filter pore size of about five millimicrons removes enough solids for further processing efficiency, it is preferred to remove all solids larger than one millimicron. A macroporous, cross linked polystyrene resin having polyisothiouronium functional groups is available commercially from Thermax Limited, 40440 Grand River, Novi, Mich. 48050, physically formed into moist spherical beads of screen size 16 to 50 and a particle size of 0.3 to 1.2 mm and is sold as Tulsion MR-200.

BRIEF DESCRIPTION OF THE DRAWINGS

The FIGURE shows the purification system of the invention.

DETAILED DESCRIPTION OF THE INVENTION

With reference to the FIGURE, the process of this invention may best be described with the flow sheet layout which runs from left to right through the various treatment stages defined. In a batch process, an initial receiving tank 1 is provided to collect contaminated water from all sources in the vaccine production facility. As shown, the receiving tank is, in this embodiment, employed as an equalization tank in which the mixed effluent is pumped through a series of molecular sieve stations 2, 3 and 4 equipped with sieve material in descending pore size from 100 millimicrons, through 20 millimicrons to 1 millimicrons and is recycled to the receiving tank in which constant mixing is provided by mechanical agitation. After the solids concentration has been reduced to about 30 milligrams per liter or less and the pH of the solution has been adjusted to about pH 6 or below, recycling to the receiving tank is stopped by opening shut-off valve 20 and closing shut-off valve 21, thereby directing the flow of liquid into activated carbon bed 6, optionally through molecular sieve 5, which passes 1 millimicron material,. The activated carbon in bed 6 decolorizes the solution and removes some other impurities such as free chlorine, phenols, oil and grease, surfactants used in cleansing glassware, etc. and some of the mercury contaminants. A 1 millimicron filter 7 protects the resin bed 8 from fouling due to the possible carry over of carbon fines from 6. The effluent from the activated carbon bed is fed to the chelating resin bed 8 where the last vestiges of mercury are removed. The pure water effluent then flows to effluent tank 9 from which it is dispersion into surface water bodies, or it can be directed from the chelating resin bed 8 directly into a surface water body or municipal water treating facility. Of course, more than one chelating resin bed can be provided, as can other series combinations of molecular sieve filters and activated carbon filter aids, without changing the gist of this invention. Similarly, operation as a continuous treatment system is feasible, by omitting the system influent receiving tank and running plant effluent directly through a series of filters to remove solids, regulating the pH of the system to about pH 6 or below with HCl followed by decolorization with activated carbon and chelation of the organic and inorganic mercury values with a chelating resin, such as MR-200, and passage of the effluent to surface water bodies. Of course, the number of filters, the activated carbon system and the chelating resin supply may have to be increased to accommodate the continuous flow system. Also, it is apparent that the activated carbon and chelating resin beds may be operated as column or true bed systems with agitation, backwashing, temperature control and recycling as indicated by good engineering practices.

Throughout the system, needle valves may be provided as desired as indicated at 22 and 24: shut off valves in addition to 20, 21 and 22, at 25, 26, and 27; check valves at 23, 28, 29 and 30; rotometers at 31 and 32; a pressure relief valve at 33 and pressure gauges at 34, 35, 36, 37 and 38.

EXAMPLE

To illustrate the mercury removal system of this invention, fifteen liters of contaminated water was filtered through a 5 millimicron rated, polypropylene spun filter cartridge (9 inches in depth) over a three hour recirculation period. The initial mercury concentration in the filtered wastewater was 0.554 parts per million (mg/L). The total suspended solids concentration in the filtered wastewater was 60 parts per million (mg/L). The initial total organic carbon concentration in the filtered wastewater was 1080 parts per million (mg/L). The filtered solution was fed through a column of granular activated carbon (36 inches in height and one inch inside diameter) to determine the capacity for contaminant removal. Color breakthrough occurred after three bed volumes of solution passed the column. After one bed volume passed the column, 96.57 per cent of the mercury content had been removed (0.0190 parts per million). After 19.5 bed volumes of solution passed the column, 51.62 per cent of the mercury had been removed (0.268 parts per million). Total organic carbon concentration was removed 94.91 percent after passing two bed volumes of solution (55 parts per million) and 21.30 per cent after passing 20 bed volumes of material (850 parts per million). Using one column of granulated activated carbon followed by one column of Tulsion MR-200, in series, color breakthrough occurred after five bed volumes passed. Mercury removal was 97.29 per cent after passage of five bed volumes of material giving a product with 15 parts per billion mercury, thereby converting waste water which may have been classified as hazardous, to non-hazardous water suitable for discharge to municipal waste water treatment plants without further treatment.

What is claimed is:

1. A process for removal of mercury from an aqueous effluent stream containing organic and inorganic mercury contaminants produced in a biological vaccine production facility, which consists essentially in:
   (a) removing solids from said effluent stream in excess of about five millimicrons in size by filtration through one or more molecular sieve filters providing pore sizes from about 100 millimicrons to about 1 millimicron;
   (b) adjusting the pH of the effluent stream to about 6 or below if it is above pH6,
   (c) decolorizing the effluent stream with activated carbon;
   (d) removing both organic and inorganic mercury compounds with a macroporous, cross-linked polystyrene chelating resin having polyisothiouronium functional groups.

2. The process of claim 1, in which all the solids larger than one millimicron in size are removed in step (a).

3. The process of claim 1 in which HCl is added to the effluent stream in step (b) to obtain a pH of about 6 or lower.

4. The process of claim 1 in which said activated carbon is impregnated with dithiocarbamic acid.

5. The process of claim 1 performed as a batch process.

6. The process of claim 1 performed as a continuous process.

7. The process of claim 1 in which contact of the mercury containing effluent with said chelating resin is continued until the mercury content of below about 15 parts per billion is obtained.

* * * * *